United States Patent Office 3,359,746
Patented Dec. 26, 1967

3,359,746
METHOD OF PRESERVING FROZEN MATERIAL
Ernest D. Razum, Box 104, Van Voorhis, Pa. 15366, and Gilfert M. Mihalich, 112 5th St., Monessen, Pa. 15062
No Drawing. Filed Aug. 23, 1965, Ser. No. 481,956
3 Claims. (Cl. 62—100)

The present invention relates to a method for storing frozen masses and more particularly to a method for storing frozen forage in a form and in a manner wherein the nutritional qualities of the forage advantageously, efficiently and economically are preserved.

Crops harvested for use as forage are in a form, following harvest, in which the nutritional value to animals rapidly is degraded by naturally occurring conditions. The degradation of forage, by presently used methods of forage preservation, are caused by oxidation, continued respiration (even after the cutting of the plant), continued chemical reactions and enzyme actions. All of the degrading actions are promoted by heat and moisture. Accordingly, forage harvested and stored by conventional techniques in barns, silos, and the like unsatisfactorily is subject to continued losses in its nutrient value. The most significant nutritional loss resulting from presently used forage preservation methods is the destruction and loss of the natural protein contained in the growing forage. Furthermore, the time and energy which are lost in preparing and re-preparing for the harvested forage collection and actual storage (under present harvesting and storage methods) is appreciable.

Present methods of preserving forage also produce great losses through weather losses and handling losses. Weather losses occur from the winds, from the fact that forage must lay on the ground for prolonged periods which induces decay, by the happening of an untimely rain during the drying process of the forage and as it lays cut in the field. These factors promote mold and rot causing the loss of the entire cut crop. Handling losses occur from the moving and processing of the forage by machines which knock off the leaves of the forage. The leaves contain most of the protein and should be preserved. Present methods of harvesting forage can be performed only during good weather conditions. This, in many instances, prevents harvesting of the crop while it is in its most optimum condition. The passing of each day beyond the optimum condition results in a substantial nutrient loss.

The structures in which forage usually is stored, after it is collected from the fields, likewise suffer from disadvantages. Barns, silos and the like are permanent structures which represent significant initial investments and require continued maintenance expenditures. Being receptacles for the total of the forage stored, such structures without extraneous control, usually become overheated and contribute to the degradative condition of the stored product and occasionally destroy the barn by spontaneous combustion.

Conventional procedures for storing forage entail placing the forage together as a bulk deposit, or stacking bound portions, i.e., bales of the forage in the available storage area. While baling of the forage does render it generally easier to handle, and at the time of desired use easier to ration, neither baling nor bulking of forage satisfactorily adapts it for transporting, handling and distributing by efficient mechanized equipment.

Upon processing forage into silage all mobility is lost and upon processing forage into hay, mobility is impractical by reason of its bulky nature.

Accordingly, it is the primary object of the present invention to provide an improved method of storing forage.

It is another object of the present invention to provide an improved method for storing forage wherein the preservation of the initial nutrient value of the forage is efficiently and economically achieved.

It is an additional object of the present invention to provide a method for efficiently storing forage wherein the moisture condition of the forage at the time it is collected in the fields following harvest is substantially immaterial.

A further object of the present invention is to provide a method for storing forage which eliminates the need and attendant expenditures for permanent conventional storage structures such as barns, silos and the like.

Yet another object of the present invention is to provide a method for efficiently storing forage wherein the forage is in a form which is adapted for transportation, handling, and dissemination at the time of desired use by mechanized equipment.

Another object of the present invention is to provide an apparatus wherein the improved forage storage technique of the invention may be carried out.

Broadly described, the present invention provides a method for storing and preserving forage which comprises in a confined zone having gas-impermeable flexible walls depositing a mass of frozen cubes or stalks of forage sufficient to essentially fill the space within said confined zone, applying a vacuum to said confined zone to collapse said flexible walls thereof against the exterior of said frozen forage mass, and thereafter continually applying a vacuum to said confined zone in order to at least intermittently sublime requisite amounts of ice from said frozen forage to maintain said forage mass at a substantially constant freezing temperature. Although the flexible-walled container has been set forth as suitable, it is also contemplated that a rigid-walled container could be used wherein the application of a vacuum would not collapse the walls. A particular advantage of the rigid-wall container would be its reuseable aspects.

In accordance with preferred embodiments of the present method, during the period in which the continuous vacuum is applied to the confined zone containing the initially frozen forage mass, the interior of the confined zone is shielded from radiant energy emanating from exterior sources by deflecting outside surfaces of the container which deflect said radiant energy.

By means of the present method, forage, immediately after harvesting, advantageously may be stored efficiently and economically without the need for subjecting the freshly cut forage to an initial time and effort consuming drying step. The freezing of the forage and the maintenance of it in this condition for an extended period to substantially contant freezing temperatures advantageously has been found to be effective to preclude any significant degradation in the nutrient value of the forage even for an indefinite storage time. Such storage stability characteristics of forage stored and preserved in accordance with the present invention result in appreciable cost savings to forage users due to the elimination of greater land allotments required to raise forage so as to overcome the nutritional loss. Also, substantial savings result from the elimination of the necessity for feeding cattle supplements to overcome the aforementioned nutritional loss. Moreover, storage of forage in accordance with the present methods eliminates altogether the need for conventional bulky permanent storage structures such as barns, silos and the like. The containers defining the collapsed confining zones in which the initially frozen forage is maintained under vacuum readily may be disposed in any area convenient for the vacuum maintenance means to await the time of the forage's intended use. Vacuum means are provided by commercially available machinery.

Forage is stored effectively in the present method irrespective of the origin or age of the forage, the initial moisture content of the forage, the size of the frozen cubes of forage, or the technique employed in freezing the forage. Preferably, the forage to be utilized in the present method is frozen and stored in accordance with the present method at a time which is relatively immediate with the harvesting of the crop employed as the forage material. This results ultimately in forage having maximum nutritional characteristics.

While any technique is contemplated for use in providing the frozen forage cubes or stalks utilized in the present storage method, the preferred method and apparatus for use is that described in copending U.S. patent application Ser. No. 299,279, now Patent No. 3,232,067, issued Feb. 1, 1967, which may be carried out in the mobile forage freezing apparatus described therein adapted for utilization in actual field terrain. In such embodiments the forage may be collected from the field and frozen by the mobile forage freezer deposited directly into storage containers suitable to be employed in the present method.

The storage container while in use in the field to collect the frozen forage mass or cubes is temporarily contained in an insulated wagon to minimize thawing of the frozen product until the container can be deposited in the storage area whereat the vacuum is applied to provide continual freezing by sublimation. Upon application of the vacuum, the container (if a collapsible one is used) collapses around the forage mass. However, the mass being composed of many small masses such as cubes or similar type stalks, permits air to pass throughout the entire container. The frozen mass must be such that when deposited and stored in the container it is conducive to air or water vapor circulation throughout the entire mass. Vacuum is continually applied throughout the entire storing period, to remove incoming energy by a process of sublimation.

The temperature of the forage throughout the entire storage period is maintained at a point below the freezing point of water and will be maintained at such a point that essentially stops the respiration of the forage. Although the storage temperature is determined to essentially eliminate the destructive respiration, it should be maintained at such a point to provide the most economical operating conditions.

When energy from outside sources enters the container, sublimation will first take place on that portion of the forage which is adjacent to the container wall. The frozen forage after sublimation takes place will produce an insulating condition, thereby providing insulation between the balance of the frozen product within and the outside energy producing environment. Furthermore, the vacuum existing throughout the container also serves as a method of insulation. It is to be noted that the forage which has been subjected to sublimation as heretofore mentioned is in a highly desirous condition for the purpose of transportation and has high nutritional value for feeding cattle. It is further to be noted that the vacuum essentially eliminates the oxygen initially contained within the container and with the product, thereby eliminating destructive oxidation.

The temperature at which the forage is maintained throughout the storage period in the present method preferably is relatively constant, but suitably may vary somewhat. The container may have a pressure sensing means to maintain the desired amount of vacuum thus resulting in maintaining the forage within a desirable freezing temperature range.

Vacuum as it is applied to the confined storage zone in the present invention causes the walls of a flexible-walled container, defining the forage confining zone, to collapse about the exterior of the deposited frozen forage mass. The magnitude of the vacuum to be applied during the storage period to the collapsed confining zone depends upon the temperature at which it is desired to maintain the forage mass. Such partial pressures are those at which equilibrium is attained between the partial pressure of ice in the frozen forage and water vapor sublimed from the frozen forage mass. For example, to maintain the stored frozen forage mass at about 29° F., the system is placed under a vacuum of about 4 mm. Hg.

The confined forage storage zone employed in the present invention suitably may be formed of any gas-impermeable flexible or rigid material. Specific examples of such materials include malleable metals such as aluminum, steel, copper and the like, reinforced rubbers and plastics such as wire reinforced-polybutadiene, polyethylene, polypropylene, polyvinylchloride and the like. In the preferred embodiments of the invention the container is characterized by having the exterior surface of its walls reflective to radiant energy. This result may be achieved by forming the container out of a single substance such as aluminum or a non-reflective substance having an exterior coating of aluminum foil. In other preferred embodiments the container may be formed of a non-reflective material and positioned within a second container having a reflective exterior surface to provide a double-walled configuration. With respect to the above-mentioned materials, it is understood that they may be constructed for use in containers as flexible or rigid walls, depending upon wall thickness.

What is claimed is:

1. A method for storing and preserving a frozen mass in the frozen state comprising confining said frozen mass within a zone of a flexible-walled container, applying a vacuum to said zone of said container whereby said flexible walls of said container collapse against said frozen mass, and continually maintaining said vacuum in said zone at a pressure of below about 4 mm. Hg sufficient to keep said mass in the frozen state.

2. The method of claim 1 wherein the walls of said container are reflective to radiant energy.

3. A method of storing and preserving forage comprising freezing said forage, depositing said frozen forage in a container having gas-impermeable flexible walls, applying a vacuum of below about 4 mm. Hg to said container whereby said flexible walls collapse against said frozen forage, and continually maintaining a vacuum in said container to maintain said frozen forage in the frozen state.

References Cited
UNITED STATES PATENTS

| | | | |
|---|---|---|---|
| 1,246,817 | 11/1917 | Jones | 62—268 |
| 1,404,400 | 1/1922 | Moon | 62—268 |
| 1,463,723 | 7/1923 | Otsuki | 62—268 |
| 2,508,385 | 5/1950 | Hall | 62—56 |
| 2,528,476 | 10/1950 | Roos | 34—92 |
| 2,618,939 | 11/1952 | Morrison | 62—341 |
| 2,731,734 | 1/1956 | Bancroft | 34—5 |
| 3,156,104 | 11/1964 | Norr | 62—268 |
| 3,245,152 | 4/1966 | Natelson | 34—5 |

WILLIAM J. WYE, *Primary Examiner.*